United States Patent [19]

Ono et al.

[11] Patent Number: 4,647,932
[45] Date of Patent: Mar. 3, 1987

[54] SPACECRAFT VELOCITY MEASUREMENT SYSTEM

[75] Inventors: Takesi Ono; Kazuo Nakamura; Toshio Okamoto, all of Tokyo, Japan

[73] Assignee: NEC Corporation, Japan

[21] Appl. No.: 488,342

[22] Filed: Apr. 25, 1983

[30] Foreign Application Priority Data

Apr. 26, 1982 [JP] Japan ................................. 57-70917

[51] Int. Cl.⁴ .............................................. G01S 3/02
[52] U.S. Cl. ..................................... 342/461; 364/455
[58] Field of Search ....................... 364/455, 459, 443; 367/89, 90, 91; 343/8, 405, 418, 461, 352, 351, 461, 377, 359; 340/670; 455/182, 257

[56] References Cited

U.S. PATENT DOCUMENTS

| 2,770,795 | 11/1956 | Peterson | 343/461 |
| 3,605,095 | 9/1971 | Higgins | 343/461 |
| 3,866,229 | 2/1975 | Hammack | 343/465 |
| 4,263,539 | 4/1981 | Barton | 343/359 |
| 4,445,119 | 4/1984 | Works | 343/377 |

Primary Examiner—Theodore M. Blum
Assistant Examiner—David Cain
Attorney, Agent, or Firm—Ostrolenk, Faber, Gerb & Soffen

[57] ABSTRACT

A system for measuring the velocity of a spacecraft from a position onboard the spacecraft is disclosed. This system includes a radio wave receiver means for receiving pulse trains from a plurality of preselected pulsars. A velocity measuring unit located on the spacecraft measures the velocity of the spacecraft based on the Doppler shift of the pulse trains transmitted from each of the plurality of preselected pulsars.

5 Claims, 2 Drawing Figures

SPACECRAFT VELOCITY MEASUREMENT SYSTEM

BACKGROUND OF THE INVENTION

This invention relates to a system for measuring the velocity of a spacecraft or of a satellite.

In a known method, the velocity of a spacecraft is measured by computing Doppler shift of a radio wave which is transmitted from the spacecraft to a station on the earth. In another known method the positions of a spacecraft relative to the earth are measured at different points of time on the basis of detected radio wave propagation time between the earth and the spacecraft, and then the velocity of the spacecraft is calculated from the obtained position data and the time intervals of the measurements. By these conventional methods, however, it is difficult to accurately measure the velocity of spacecraft in that these methods provide only a velocity vector in the line-of-sight direction. Besides, communication between the spacecraft and the earth is indispensable to the conventional methods, and therefore there is the need of providing and maintaining sophisticated ground receiver apparatus which in some cases have to include a transmitter and in every case require an antenna system of large scale.

SUMMARY OF THE INVENTION

Accordingly it is an object of the present invention to provide a novel system for measuring the velocity of a spacecraft, which system accomplishes onboard velocity determination, without the need of communication with the earth, by utilizing radio waves of nearly rectangular waveform emitted from the celestial bodies known as pulsars.

It is another object of the invention to provide a system for measuring the velocity of a spacecraft at any location with very high accuracy by detecting the spacecraft's velocity vectors in different directions through the use of radio waves emitted from a plurality of pulsars.

According to one aspect of the present invention, there is provided a system for measuring the velocity of a spacecraft onboard the spacecraft, the system comprising a radio wave receiving and speed measuring onboard unit which has the function of measuring the spacecraft velocity based on Doppler shift of a pulse train transmitted from each of a plurality of preselected pulsars.

BRIEF DESCRIPTION OF THE DRAWINGS

Other objects, features and advantages of the invention will become apparent from the following description with reference to the accompanying drawings, in which.

DESCRIPTION OF THE PREFERRED EMBODIMENT

It is known that pulsars emits pulsating radio waves having pulse repetition periods ranging from about 10 msec to a few seconds and having pulse widths from 10 to 30 msec. The pulse repetition period of each individual pulsar is generally constant with a accuracy of the order of $10^{-8}$. At this time, a total of about 50 pulsars have been discovered, and these pulsars are celestial bodies of the Galactic system away from the sun ranging from tens of parsecs (1 parsec = 3.262 light years = $3.086 \times 10^{13}$ km) to thousands of parsecs. A detailed explanation of "Pulsars" is given in the book written by R. N. Manchester et al. and published by W. H. Feeman & Company (1977).

Figure 1:
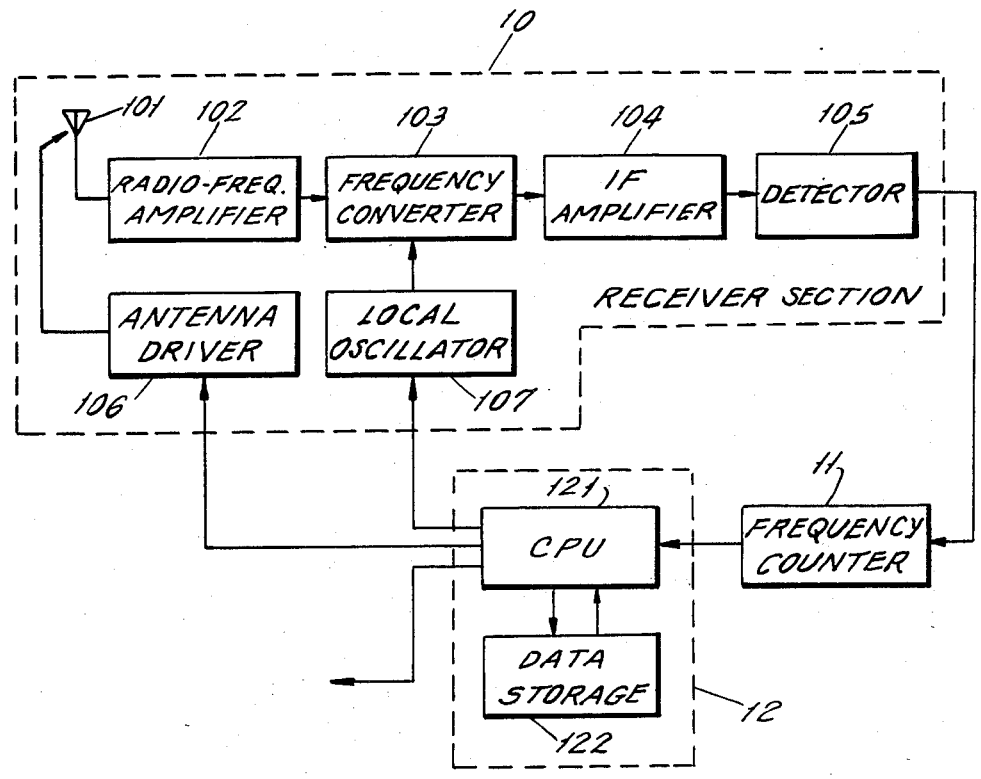
FIG. 1 is a block diagram of a spacecraft velocity measuring onboard unit according to the invention.

FIG. 1 exemplifies a preferred arrangement of a spacecraft velocity measurement system according to the invention. The receiving unit includes a receiver section 10, a high-accuracy frequency counter 11 and a computer section 12. The receiver section 10 is set to receive the UHF band in that most of the hitherto obtained data about pulsars are present therein. The frequency counter 11 has a accuracy of the order of 1 nsec in terms of time resolution, and, for example, MODEL 5345A manufactured by Hewlett-Packard Company is suitable therefor.

A pulse-like radio wave emitted from a pulsar and received by antenna 101 is amplified by a radio-frequency amplifier 102 and then fed to a frequency converter 103. The frequency converter 103 receives a local oscillation signal from a local oscillator 107 and converts the frequency of the pulse-like radio wave into a corresponding intermediate frequency (IF). The signal from the frequency converter 103 is amplified by an IF amplifier 104 and then fed to a detector 105 which performs detection or demodulation and wave-shaping and produces a pulse signal therefrom.

The frequency counter 11 is adapted to measure the pulse repetition period and pulse width of the signal from the detector 105, and applies data concerning the pulse period and pulse width obtained within a prefixed time duration to the computer 12. Using these two types of data, the computer 12 computes the velocity vector of the spacecraft installed with the unit of FIG. 1 in accordance with the algorithm described hereinafter to thereby measure the speed and the direction of flight of the spacecraft.

The computer 12 has a central processing unit (CPU) 121 and a data memory 122 such as a read-only memory (ROM). The ROM 122 stores therein the necessary data, viz. pulse repetition periods and pulse widths of the preselected pulsars. In advance of computation of the velocity vector of the spacecraft, the CPU 121 applies, based on the information stored in the ROM 122, an antenna direction signal to an antenna driver 107 and also a receiving frequency preset signal to the local oscillator 107 in order to set the receiver section 10 in an optimum receiving state.

The following is a concise description of the algorithm for the measurement of the spacecraft velocity.

The pulse repetition period $t_s$ of a pulsar measured by the frequency counter 11 is expressed by the following equation:

$$t_s = t_b + \vec{v}\cdot\vec{n}/c \tag{1}$$

where $t_b$ is the pulse repetition period of the pulsar determined in a coordinate system with the center of gravity of the solar system at its origin, which is obtained in advance by subtracting from a value measured on the earth a value representative of the effect of the motion of the earth and stored in the ROM 122, $\vec{v}$ is the velocity vector to be measured, $\vec{n}$ is the unit vector in the direction toward the pulsar from the spacecraft, and c is the velocity of light.

In practice, a suitable number K of pulsars are used to measure the velocity of the spacecraft. For each of these pulsars the pulse repetition period $t_s$ is measured, and a difference $\Delta t$ of the measured period $t_s$ from the period $t_b$ stored in the ROM 122 is calculated:

$$\Delta t_i = t_{si} - t_{bi},$$
$$i = 1, 2, \ldots K \quad (2)$$

And then the velocity vector $\vec{v}$ is determined by the least squares method, that is, by a series of calculation to render the result of the following summation minimum.

$$\sum_{i=1}^{k} \left( \Delta t_i - \frac{\vec{v} \cdot \vec{n_i}}{c} \right)^2 \quad (3)$$

By employing a suitable internal coordinate system (X, Y, Z) and expressing $\vec{v}$ and $\vec{n}$ in the following manner $$\vec{v} = (v_x, v_y, v_z) \quad (4)$$
$$\vec{n} = (n_x, n_y, n_z)$$

the minimum condition of the summation (3) is given by the following set of equations.

$$\frac{\partial}{\partial v_x} \sum_{i=1}^{k} \left( \Delta t_i - \frac{v_x n_{xi} + v_y n_{yi} + v_z n_{zi}}{c} \right)^2 = 0 \quad (5)$$

$$\frac{\partial}{\partial v_y} \sum_{i=1}^{k} \left( \Delta t_i - \frac{v_x n_{xi} + v_y n_{yi} + v_z n_{zi}}{c} \right)^2 = 0$$

$$\frac{\partial}{\partial v_z} \sum_{i=1}^{k} \left( \Delta t_i - \frac{v_x n_{xi} + v_y n_{yi} + v_x n_{zi}}{c} \right)^2 = 0$$

These equations turn into the following set of equations.

$$\sum_{i=1}^{k} \left\{ \frac{2 v_x n_{xi}^2}{c^2} - \frac{n_{xi}}{c} \left( \Delta t_i - \frac{v_y v_{yi} + v_z n_{zi}}{c} \right) \right\} = 0 \quad (6)$$

$$\sum_{i=1}^{k} \left\{ \frac{2 v_y n_{yi}^2}{c^2} - \frac{n_{yi}}{c} \left( \Delta t_i - \frac{v_z n_{zi} + v_x n_{xi}}{c} \right) \right\} = 0$$

$$\sum_{i=1}^{k} \left\{ \frac{2 v_z n_{zi}^2}{c^2} - \frac{n_{zi}}{c} \left( \Delta t_i - \frac{v_x n_{xi} + v_y n_{yi}}{c} \right) \right\} = 0$$

The velocity vector $\vec{v}$ is computed by solving the simulataneous linear equations (6) with three variables $v_x, v_y, v_z$ by the operation of the computer section 12. If the absolute value $\vec{v}$ of the computed velocity vector is larger than a predetermined value $v_c$, the aforementioned difference $\Delta t_i$ is multiplied by a correction factor $1/\sqrt{1 - v_c^2/c^2}$ according to the special theory of relativity, and then the above described calculation is repeated.

Figure 2:
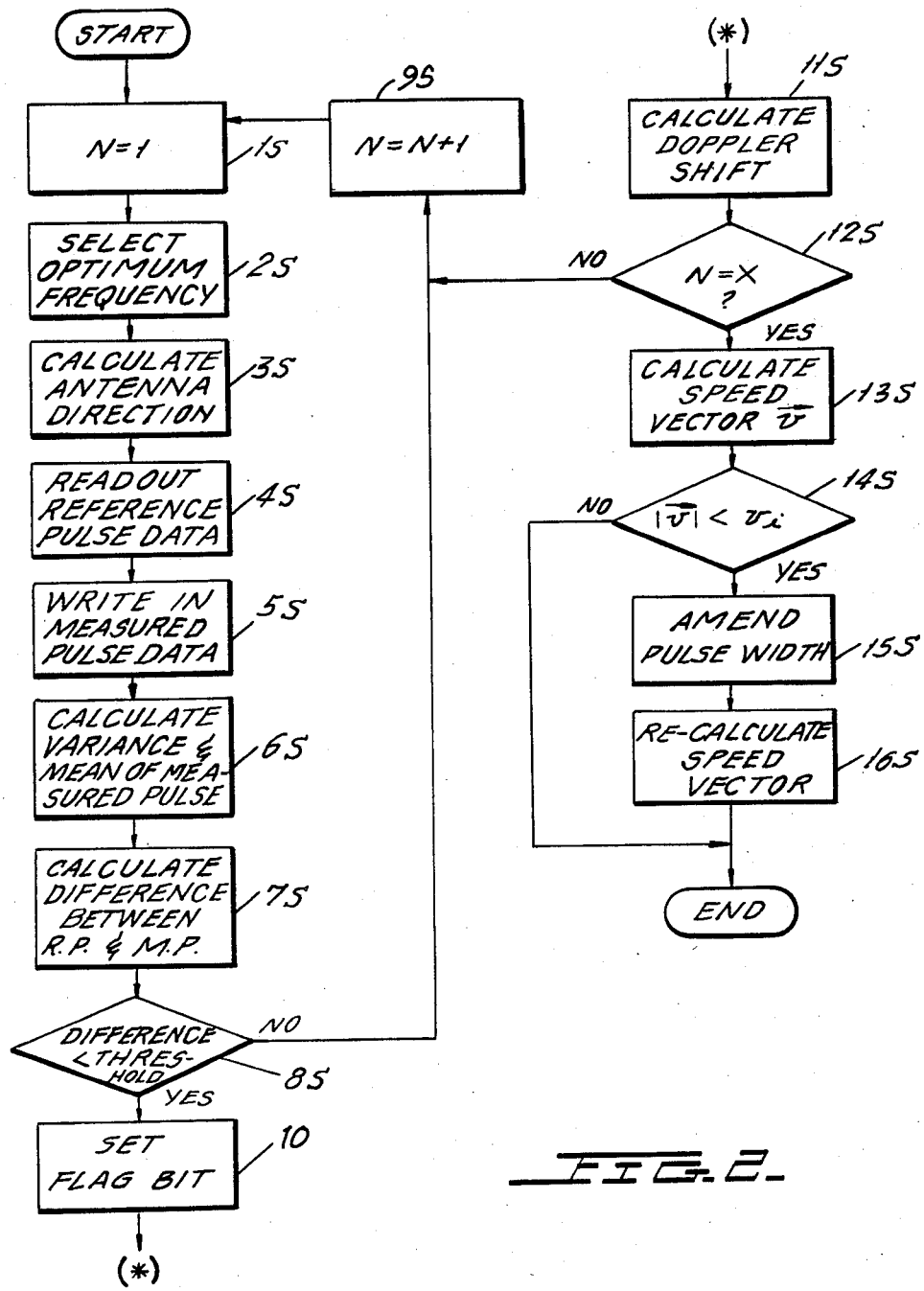
FIG. 2 is a flow chart showing operation steps of a computer section of the unit shown in FIG. 1.

The operating steps in the computer section 12 will be described more in detail with reference to the flow chart of FIG. 2.

At step 1S, the CPU 121 in the computer section 12 determines the identification number N of a target pulsar. In the initial state the value of N is 1. At steps 2S and 3S, the CPU 121 reads out the data corresponding to the determined identification number N from the ROM 122 to computer an optimum oscillation frequency of the local oscillator 107 and an optimum direction of the antenna 101 and provides control signals indicative of the results of the computation to the local oscillator 107 and to the antenna driver 106, respectively, thereby adjusting the receiver section 10 to an optimum receiving state.

At step 4S, the CPU 121 reads out the reference values of the pulse repetition period and pulse width of the same pulsar stored in the ROM 122, and at step 5S the measured values of the pulse repetition period and pulse width are loaded into the CPU 121 from the frequency counter 11. At step 6S the variance and mean value of the measured pulse data are calculated, and at step 7S the differences of the values calculated at step 6S from the reference values read out from the ROM 122 at step 4S are calculated. At step 8S, the CPU makes a judgement whether or not the received pulse signal is the pulse train transmitted from the target pulsar by checking whether or not the differences calculated at step 7S are each smaller than a predetermined threshold value.

If the differences checked at step 8S are each larger than the threshold value, the processing advances to step 9S where another preselected pulsar is taken as the target, and the procrdure of steps 1S-8S is repeated. Otherwise the processing goes to step 10S where a flag bit is set to indicate that the pulse signal emitted from the target pulsar is received. Then, at step 11S the Doppler shift of the pulse of the target pulsar in the line-of-sight direction is calculated from the aforementioned differences. At step 12S, a judgement is made whether or not the pulse data have been obtained for the predetermined number (X) of pulsars, and in case of negative judgement the procedure of steps 1S-8S is repeated via step 9S.

When a required amount of data are obtained, the processing advances from step 12S to step 13S where the velocity vector of the spacecraft in the employed inertial coordinate system is calculated according to the above described algorithm for the computation of the velocity vector. At step 14S, a judgement is made if the absolute value of the velocity vector of the spacecraft measured in the employed inertial coordinate system is so large as needs for a correction according to the special theory of relativity. When such a correction is not necessary the processing comes to an end. If the correction is necessary the processing goes to step 15S where the aforementioned correction according to the special theory of relativity is made, and then at step 16S the velocity vector is re-calculated on the basis of the corrected data.

As will have been understood from the foregoing description, the present invention has made it possible to independently determine the velocity of a spacecraft onboard the spacecraft and, therefore, will enable to make space flight to very distance planets such as Uranus and Neptune or beyond the boundary of the solar system. Of course this invention is applicable also to the relatively short range space flight with the advantage of higher accuracy in measuring the orbit of each spacecraft compared with conventional velocity measurement methods. It is also possible to jointly use a system according to the invention and a conventional velocity measurement system, and in this case the total system becomes very high in accuracy and reliability.

What is claimed is:

1. A system for measuring the directional velocity of a spacecraft onboard the spacecraft, the system comprising:
   a radio wave receiver means located on the spacecraft for receiving pulse trains from at least three preselected pulsars;
   frequency counter means responsive to the output of said receiver means for measuring the pulse repetition period of a respective pulse train from each of said pulsars;
   memory means for storing predetermined information about the pulse repetition period of the pulse train transmitted from each of said pulsars, which information is previously measured and calculated on the earth; and
   control means for detecting the Doppler shifts of said received pulse trains to compute the velocity vector of the spacecraft by utilizing the pulse repetition periods measured by said frequency counter means and said information in said memory means.

2. A system according to claim 1, wherein said receiver means receives the pulse trains transmitted from each of said pulsars and produces a corresponding pulse signal representative of said pulse trains, said receiver means being responsive to a control signal which adjusts said receiver means to an optimum state for receiving of the respective pulse train transmitted by each of said pulsars; and wherein said control means provides said control signal to said receiver means in accordance with said information in said memory means.

3. A system according to claim 2, wherein said control means computes said velocity vector by the least square method.

4. A system according to claim 2, wherein said receiver means comprises:
   an antenna of variable directivity for receiving the respective pulse trains transmitted from said plurality of pulsars;
   an antenna driver for selectively controlling the direction of said antenna in response to an antenna direction control signal;
   a frequency converter for converting the frequency of each pulse train received by said antenna by using a local oscillation signal;
   a local oscillator responsive to a local oscillation frequency control signal and for supplying said frequency converter with a signal having a frequency corresponding to the frequency of each of the pulse trains from said plurality of pulsars as said local oscillation signal; and
   a detector for detecting each pulse train from said frequency converter and shaping the waveform of the detected pulse train thereby providing a signal which corresponds to the output of the receiver means, said control means providing said antenna direction control signal and said local oscillation frequency control signal each as a component of said control signal on the basis of said information in said memory means.

5. A system according to claims 2, 3 or 4, wherein said memory means comprises a read-only memory.

* * * * *